United States Patent
Pinnow et al.

[11] 3,779,627
[45] Dec. 18, 1973

[54] OPTICAL TRANSMISSION LINE ELEMENTS UTILIZING FLUORINATED POLYMERS

[75] Inventors: Douglas Arthur Pinnow, Berkeley Heights; LeGrand Gerard Van Uitert, Morris, both of N.J.

[73] Assignee: Bell Telephone Laboratories, Incorporated, Murray Hill, Berkeley Heights, N.J.

[22] Filed: May 17, 1971

[21] Appl. No.: 143,876

[52] U.S. Cl. .................. 350/96 WG, 350/96 R
[51] Int. Cl. .................................... G02b 5/14
[58] Field of Search ............... 350/96 WG, 175 NG

[56] References Cited
UNITED STATES PATENTS

| | | |
|---|---|---|
| 3,556,635 | 1/1971 | Schrenk et al. ........ 350/96 WG UX |
| 3,641,332 | 2/1972 | Reick et al. .................. 350/96 R X |
| 2,794,959 | 6/1957 | Fox ........................ 350/96 WG UX |
| 3,542,461 | 11/1970 | Girard ............................... 351/160 |
| 3,386,787 | 6/1968 | Kaplan .......................... 350/96 WG |

FOREIGN PATENTS OR APPLICATIONS
1,037,498  7/1966  Great Britain ................ 350/96 WG

OTHER PUBLICATIONS

Marcuse et al., "Mode Conversion Caused by Diameter Changes of a Round Dielectric Waveguide" The Bell System Technical Journal, Vol. 48, No. 10, Dec. 1969, pp. 3217–3232.

Primary Examiner—John K. Corbin
Attorney—W. L. Keefauver and Edwin B. Cave

[57] ABSTRACT

Optical transmission lines constructed of fully fluorinated polymers in the amorphous state, such as fluorinated ethylene propylene, have low inherent insertion loss characteristics.

9 Claims, 1 Drawing Figure

PATENTED DEC 18 1973
3,779,627
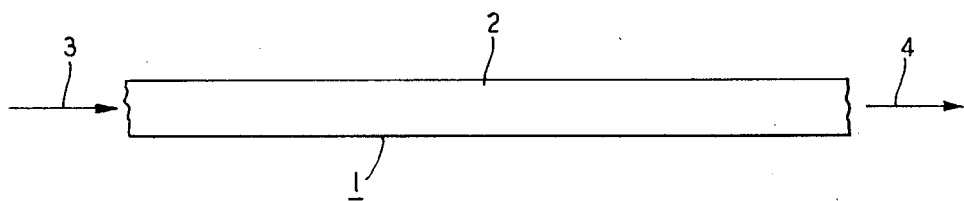
INVENTORS D.A. PINNOW
L.G. VAN UITERT
BY
George S. Indig
ATTORNEY 3,779,627

OPTICAL TRANSMISSION LINE ELEMENTS UTILIZING FLUORINATED POLYMERS

BACKGROUND OF THE INVENTION

1. Field of the Invention

The invention is concerned with glass transmission lines for use in the visible and near-visible spectrum.

2. Description of the Prior Art

The invention of the laser almost immediately prompted interest in the development of broadband communications systems. Progress has been significant. New and more efficient lasers have evolved as have useful circuit elements performing a multitude of functions, e.g., modulation, frequency shifting, isolation, etc. It is well known to workers in the field that a significant obstacle to a light communication system is the development of a suitable low-loss transmission medium. Various approaches have been pursued; some focusing, some not focusing, some utilizing vacuum, some using gaseous media, some crystalline or glassy. Of these, many workers believe the glass transmission line to be most promising, particularly for intrametropolis and other short-haul use.

Probably the most significant work in glass transmission lines has been concerned with various types of silicate glasses. Such materials are familiar; preparatory techniques are known, and they are possessed of certain obvious practical advantages, e.g., chemical and physical stability. See, for example, Vol. 11, *Glass Technology*, pp.30–35, April 1970. According to F. P. Kapron et al., *Applied Physics Letters*, volume 17, pp. 423–425, Nov. 15, 1970, transmission lines of carefully prepared fused silica have insertion losses of approximately 20 dB per kilometer at a wavelength of 6,328 angstrom units.

It is reasonable to assume that the best of the optical transmission materials now considered to be of greatest interest will soon be available in such a high degree of perfection that insertion loss will be due, in large part, to inherent characteristics. It may be estimated that pure silica in its most perfect form will have an insertion loss of approximately 5 dB/km at a wavelength of 0.5 microns which is near the center of the visible spectrum.

SUMMARY OF THE INVENTION

In accordance with the invention, optical transmission lines are constructed of fluorinated organic polymeric material in a glassy state. While processing complications may be encountered in minimizing crystallinity for certain of the included compositions, the additional effort is justified on the basis of an extremely small inherent loss.

Use of fluorinated polymers, exemplified by tetrafluorinated ethylene-propylene copolymer is prompted by a theoretical development reported herein. Accordingly it is determined that inherent scattering loss is proportional to the eighth power of the refractive index. Indices of materials of the invention are generally below about 1.35 relative to vacuum. These are among the lowest indices of known nongaseous media and compare with values of about 1.5 for silica glasses.

Other properties of the fluorocarbon materials of the invention are generally desirable. Such materials are substantially unaffected by usual atmospheric conditions and otherwise show requisite chemical and physical stability for transmission line use. Once crystallinity has been minimized, materials are readily formed into fibers or other shapes, either self-supporting or supported.

Other favorable characteristics concerned with melting point, absorption related to energy gap, and absorption due to infrared active mechanical modes are discussed under the Detailed Description.

BRIEF DESCRIPTION OF THE DRAWING

The FIGURE is a cross-sectional view of a portion of a glass transmission line in accordance with the invention.

DETAILED DESCRIPTION

1. The Drawing

The FIGURE depicts a portion of an optical transmission line 1 constructed of a fluorinated glassy polymer in accordance with the invention. Electromagnetic radiation depicted as arrows 3 and 4 is introduced from source and by means not shown and is extracted by means not shown. Introduction and extraction means may both include closely matched or otherwise related media of appropriate refractive index and/or may include one or more optically polished surfaces. For general purposes, radiation to be transmitted in the inventive structure is either incoherent or coherent so that an appropriate source may constitute any of the variety of light-emitting diodes or laser oscillators which emit radiation which is, itself, of a wavelength within the transparent region of medium 2 or which may be converted by parametric or other means to fall within this region.

Structure 1 may be regarded as self-supporting, for example, in the form of a fiber or it may be supported on a substrate, in which event, it may constitute a segment of a printed optical circuit.

2. Theory

It is well known that an optical beam exponentially decreases in intensity when traveling through an attenuating medium. Thus, a beam of initial intensity $I_o$ is reduced to intensity $I$ after traveling a distance X. Thus $$I = I_o e^{-\alpha_{tot} x} \quad (1)$$

where $\alpha_{tot}$ is the total attenuation coefficient which is composed of two parts associated with scattering and absorption $$\alpha_{tot} = \alpha_{scat} + \alpha_{abo} \quad (2)$$

The first part is the Rayleigh scattering coefficient. A recent analysis of the Rayleigh scattering loss in optical glass (Pinnow, unpublished) indicates that $\alpha_{scat}$ is proportional to the following material parameters:

$$\Delta_{scat} \sim (n^8 p^2 / \rho V^2)(T + T_g) \quad (3)$$

where
$n$ = index of refraction
$p$ = photoelastic component
$\rho$ = density
$V$ = sound velocity
$T$ = ambient temperature and
$T_g$ = glass melting temperature.

This analysis is based on an extension of classical light scattering theory (see, for example, I. L. Fabelinskii, *Molecular Scattering of Light*, Plenum Press, New York; 1968) modified by the recent theory of D. A. Pinnow, S. J. Candau, J. T. LaMacchia, and T. A. Litovitz (*Journal of Acoustical Society of America*, Vol. 43, 131–142, Jan. 1968) which is specifically applicable to the glassy state.

The most important parameters in this formula are $n^8$ and $T_g$. The magnitude of $p$ for most liquids and glasses can be approximated by the Lorentz-Lorentz value $$p = [(n^2-1)(n^2=2)]/3n^4 \quad (4)$$

which is almost constant and equal to 0.35 for $n$ in the range of 1.5 to 2.5 (for indices of refraction less than 1.5, $p$ is somewhat smaller), see D. A. Pinnow, *IEEE Journal of Quantum Electronics*, Vol. QE-6, 223–238, April 1970). The quantity $V$ which appears in the denominator of the Rayleigh scattering formula is equal to the elastic modules of a material which may vary considerably from one material to the next. However, it is expected that the variations in $n^8$ and $T_g$ will dominate the Rayleigh scattering coefficient. In order to reduce this scattering, materials should be selected with low $n^8(T+T_g)$ values.

From the inventive standpoint, primary significance is attached to the influence of refractive index on loss due to inherent scattering mechanisms. It has certainly been recognized previously that scattering is reduced for lowered refractive index, but the fact that the dependence is on the index raised to the eighth power is surprising. The significance of this factor in the insertion loss gives impetus to the search for otherwise suitable low index materials. This impetus is sufficient to focus attention on the generally overlooked materials of the invention which in their usual form, may not be obviously suitable for light transmission use.

The materials of the invention are advantageous also from the standpoint of low $T_g$. Typically, melting points for the materials of the invention are of the order of 350° C which compares quite favorably with the usual silicate glasses having melting points of the order of 1000° C or higher (melting point is here defined as the temperature to which the medium must be raised to reduce its viscosity to the value of about $10^7$ poises). Other advantages are discussed in a succeeding section.

3. Composition

As discussed in some detail in the next section, primary advantages ascribed to the materials utilized in the structures of the invention derive from carbon-fluorine bonding. An overriding requirement for all included compositions is, therefore, expressed in terms of the number of such bonds. Advantages ascribed to the included materials accrue as the ratio of carbon-to-fluorine bonds relative to other carbon-to-terminal atom bonds increases. Such advantages, for example, including lowered refractive index, are maximized for a totally fluorinated polymer. The minimal requirement based on such considerations is a ratio of at least 50 percent, it being considered that substantially smaller ratios result in indices and other transmission characteristics representative only of relatively insubstantial improvement as compared with nonfluorinated polymers. Other compositional considerations are dictated where the polymer is not totally fluorinated so that some of the carbon-to-terminal atom bonds involve other elements. To minimize absorptions due to hydrogen (typically at wavelengths of about 3.4, 1.7, and 1.1 micrometers), it is a general requirement that the ratio of C-H bonds to the totallity of bonds between carbon atoms and terminal atoms be kept to a minimum. From the standpoint of the invention, it is generally desired that such ratio be no greater than about 1:3 with a preference existing for 1:10 and optimally a ratio of less than 1:10⁶

Where the polymeric material is not totally fluorinated, it is desired that terminal atoms be deuterium since the characteristic infrared absorptions are shifted to about 4.8, 2.4, and 1.6 micrometers. In addition to avoiding the shorter wavelength absorption associated with hydrogen, the deuterium atoms may be so placed as to give rise to a net dipole moment associated with the C-F bonds. Molecular alignment which may be achieved under such circumstances by means of electrical poling with or without mechanical working may result in reduced scattering.

Other terminal groups are permitted providing carbon bonding to such groups is kept below the maximum prescribed above; of course, providing that such terminal groups are not of such nature as to have characteristic absorptions within a concerned wavelength range.

Generally, the most prevalent class of acceptable polymers are the fluorocarbons. As discussed above, the preferred subclass contains primarily or solely fluorine terminal atoms. An exemplary material is the copolymer of fully fluorinated ethylene propylene. In this preferred subclass, the ratio of ethylene to propylene should be such as to be polymerizable from intital ingredients which include at least 10 percent of each monomer. The advantage of the copolymer as compared to a homopolymer, such as polytetrofluoroethylene, is the comparative ease with which the crystallinity may be minimized.

Another class of polymeric materials meeting the inventive requirements is the perfluoroalkylpolyethers. These materials may be represented as having the formula:

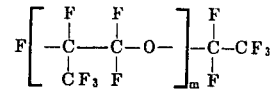

The value of $m$ in the preceding formula is of general interest. For that particular compound, values of $m$ above about $10^3$ are sufficient to result in a reasonably rigid material at room temperature. Values below $10^3$ down to about 3 are not to be discounted. Liquid state materials of the invention are suitable guide materials and retain the noted advantages (and here again the distinction between rigid and liquid is found to occur at a viscosity of approximately $10^7$ poises). Liquid materials, in accordance with the invention, have the advantage of further reduced Rayleigh scattering due to the influence of $T_g$ in the relationship set forth in Equation (1). Use of liquids also avoids difficulties due to crystallinity. Of course, liquids require containing walls and precautions against discontinuities which may develop during use.

In general, it is preferred that materials of the invention be rigid (i.e., having a viscosity above $10^7$ poises)

at the operating temperature which is usually defined as room temperature.

4. Material Preparation

Certain of the inventive materials tend to crystallize. Crystallinity may be minimized in these materials by rapid cooling. In general, quench rates of at least about 100° C per second generally from the interval between a molten and rigid form are sufficient to meet this desired criterion. It is fortunate that the generally small diameters of the optical fibers permit such rapid cooling.

For liquid polymers the major requirement is simply absence of impurities or other inhomogeneities which may produce scattering or absorption. Purities of 1 ppm are generally achievable and are desirable.

5. Examples

Examples may be divided into liquid or rigid polymers. The liquids of interest include perfluoroalkyl-polyethers, e.g.,

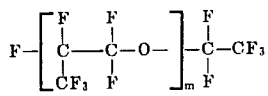

with $m = 1.20$.

For example where $m=9$ the $\alpha_{scat}$ is less than one-half that of fused $SiO_2$. Exceeding the limit increases $\alpha_{scat}$. For example, when $m$ was as high as 43 $\alpha_{scat}$ was 10 times worse than fused silica. Other liquids of interest are

| | Boiling Point |
|---|---|
| $(CF_3)_2CF\ CF_2C(CF_3)_3$ | 103 |
| $(CF_3)_2CF(CF_2)_4CF(CF_3)_2$ | 144 |
| $n-C_{13}F_{28}$ | 194 |
| $CF_2=CF\ CF_2CF=CF_2$ | 123 |
| $CF_2=CF(CF_2)_nCF=CF_2$ | 181 |

Solids include materials with an average of more than 1000 repetitive monomer formula units per chain ($m > 1000$). Such materials can be processed to maintain a preferred orientation as discussed earlier. The solids include polymers of

| | |
|---|---|
| tetrafluoro ethylene | $F(-CF_2-CF_2-)_m-CF_2=CF_2$ |
| chlorotrifluoro ethylene | $F(-CFCl-CF_2-)_m-CCl=CF_2$ |
| hexafluoro propylene | |

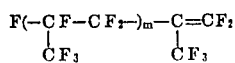

octafluoro butylene

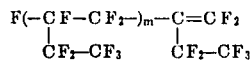

perfluoro propylene oxide

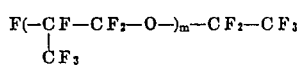

and mixtures and copolymers thereof.

Many variations are possible which may improve cross linkage between chains and thereby reduce crystallization and improve optical properties.

The requirement for molecule length may be set forth in general terms regardless of composition. Accordingly, it is specified that molecules of particular interest contain either up to about 50 carbon atoms or, alternatively, above about 2000 carbon atoms in a main polymer chain. The first limit defines materials which are normally liquid at room temperature. The low limit is not specified and is to be determined primarily on the basis of permitted volatility for a given structure. Above about 50 carbon atoms the molecule length begins to approach the order of magnitude of a wavelength of light. The range from about 50 carbons to about 2000 carbons is to be avoided since dimensions, regardless of composition, are such as to result in an increase in scattering efficiency. The maximum for the normally rigid polymers (containing more than about 2000 carbons in the main chain) is to be determined on the basis of such practical considerations as processing difficulty and availability. Materials having substantially larger numbers of carbons are useful providing the general requirements of the invention are met, e.g., crystallinity below about 1 percent, etc.

6. General Properties

The strong carbon-to-fluorine bond is responsible for the primary characteristics of the material to which the invention is limited. The effect on refractive index is considered to arise from the constraint which is imposed on bonding electrons which, in turn, minimizes their contribution to polarizing effects. In fact, fluorinated materials of the nature here described have indices of refraction which range generally from about 1.2 to about 1.35.

While the rigid fluorocarbons are noted for their high melting points, as compared with other organic polymeric materials, melting points are generally less than about 350° C. Materials utilized in accordance with the invention are, therefore, temperature stable in any likely environment to be encountered in operation but the melting point is still sufficiently low to reduce this contribution to Rayleigh scattering as compared with the usual inorganic glasses.

Another consequence of the strong C–F bond is the relatively large energy gap of the order of 6eV or greater. In consequence, completely fluorinated fluorocarbons are quite transparent in the ultraviolet portion of the spectrum (an energy gap of 6eV corresponds to a wavelength of about 2000 angstrom units). While this may not be of immediate commercial interest since ultraviolet systems are not presently at an advanced development stage, there are consequences at longer wavelength. A contribution to optical absorption decreases in proportion to the difference in the transmitted wavelength and the wavelength corresponding with the energy gap. This contribution is considered to be related to absorptive transitions to localized states within the forbidden energy gap which are thought to be fundamentally associated with amorphous structures. Regardless of the source of this contribution, it has been experimentally verified that absorption for a given wavelength of transmitted energy decreases for increasing energy gap.

An additional advantage of fluorinated polymeric glasses is increased transparency at longer infrared wavelength than for many other materials. This is, in turn, due to the fact that the characteristic band-stretching frequency of the carbon-to-fluroine bond is sustantially further out in the infrared spectrum than is that of other bonds (about 80,000 angstrom units for C–F as compared with 34,000 angstrom units for C–H). Substitution of deuterium for hydrogen in partially fluorinated polymers also extends the infrared absorption edge out to about 48,000 Angstrom units while infrared absorption in pure silicate glasses, by comparison, sets in only at about 100,000 angstrom units, water impurities, which are difficult to remove, generally cause absorption at about 27,000 angstrom units.

What is claimed is:

1. Optical transmission line of electromagnetic radiation for use within a spectrum including infrared and ultraviolet radiation comprising a substantially amorphous member for transmitting such radiation and first and second means for introducing and extracting radiation into and from said member, respectively, characterized in that said member consists essentially of a composition having a crystallinity of less than 1 percent as measured by optical or X-ray techniques and in that the said composition contains at least 65 percent carbon-to-fluorine bonds based on the total number of bonds between carbon atoms and terminal atoms.

2. Transmission line of claim 1 in which said composition is polymeric, and has a viscosity of at least $10^7$ poises at room temperature.

3. Transmission line of claim 2 in which said composition contains an average of at least 2000 carbon atoms in the main chain of the polymer molecule and is rigid at room temperature.

4. Transmission line of claim 1 in which essentially all the bonds between carbon atoms and terminal atoms are carbon-to-fluorine bonds.

5. Transmission line of claim 4 in which said composition consists essentially of a fluorocarbon.

6. Transmission line of claim 5 in which said fluorocarbon is fluorinated ethylene propylene copolymer containing at least 10 percent of moieties which may be derived from each of the monomers, ethylene and propylene.

7. Transmission line of claim 6 in which the average chain of said copolymer contains at least $10^3$ monomeric units.

8. Transmission line of claim 4 in which said composition consists essentially of perfluoroalkylpolyethers, in which the average polymer chain contains at least $10^3$ monomeric units.

9. Transmission line of claim 1 in which said composition is normally liquid and has an average of up to 50 carbon atoms per molecule.

* * * * *

UNITED STATES PATENT OFFICE
CERTIFICATE OF CORRECTION

Patent No. 3,779,627                    Dated December 18, 1973

Inventor(s) Douglas A. Pinnow and LeGrand G. Van Uitert

It is certified that error appears in the above-identified patent and that said Letters Patent are hereby corrected as shown below:

*Column 2, line 56, change "(Pinnow, unpublished)" to read:

--(see an article entitled "Fundamental Optical Attenuation Limits in the Liquid and Glassy State with Application to Fiber Optical Waveguide Materials" by D. A. Pinnow et al., appearing in Applied Physics Letters, May 15, 1973)--.

Column 3, Equation (4), change "$(n^2=2)$" to read --$(n^2+2)$--.

*Column 6, line 63, change "fluroine" to read --fluorine--;

*Column 6, line 64, change "sustantially" to read --substantially--.

Signed and sealed this 24th day of September 1974.

(SEAL)
Attest:

McCOY M. GIBSON JR.
Attesting Officer

C. MARSHALL DANN
Commissioner of Patents